(12) United States Patent
Law

(10) Patent No.: US 7,607,348 B2
(45) Date of Patent: Oct. 27, 2009

(54) MEASURING DEVICE

(75) Inventor: Siu-Leung Law, Kowloon (CN)

(73) Assignee: Emmarco Industries Company Limited, Kowloon, Hong Kong (CN)

( * ) Notice: Subject to any disclaimer, the term of this patent is extended or adjusted under 35 U.S.C. 154(b) by 0 days.

(21) Appl. No.: 11/973,788

(22) Filed: Oct. 10, 2007

(65) Prior Publication Data
US 2008/0282798 A1 Nov. 20, 2008

(30) Foreign Application Priority Data
May 16, 2007 (HK) .................. 07105182

(51) Int. Cl.
G01F 19/00 (2006.01)

(52) U.S. Cl. .................. 73/427; 73/429; D10/46.2; D10/101

(58) Field of Classification Search .......... 73/426–429; 33/1 V; 116/227, 327; D10/46, 46.2, 96, D10/101
See application file for complete search history.

(56) References Cited

U.S. PATENT DOCUMENTS

D112,173 S * 11/1938 Kingsbury ............... D10/46.3
D113,538 S * 2/1939 Kingsbury ............... D10/46.3
2,259,504 A * 10/1941 Wilson et al. .............. 73/426
2,683,374 A * 7/1954 Finley ...................... 73/426
3,496,778 A * 2/1970 Konno ...................... 73/426
D228,722 S * 10/1973 Grimes ..................... D10/46.3
4,377,191 A * 3/1983 Yamaguchi ................ 220/665
D339,992 S * 10/1993 Goldman .................. D10/46.2
5,439,128 A * 8/1995 Fishman ..................... 220/8
2004/0249059 A1* 12/2004 Akbar et al. ............... 524/588
2005/0127073 A1* 6/2005 Kusuma et al. .............. 220/6
2005/0193899 A1* 9/2005 DeBlassie et al. ........... 99/426
2005/0199132 A1* 9/2005 Meeks et al. ................ 99/426
2006/0277994 A1* 12/2006 Peterson .................... 73/426

FOREIGN PATENT DOCUMENTS

JP 2000006972 A * 1/2000
RU 2059399 C * 5/1996

* cited by examiner

Primary Examiner—David A. Rogers
(74) Attorney, Agent, or Firm—Alix, Yales & Ristas, LLP

(57) ABSTRACT

A measuring device has one or more vessels with an adjustable capacity. The vessel is made of a flexible material with a peripheral hinge. The peripheral hinge enables the vessel to be reconfigured from one configuration having a first holding capacity to a second configuration having a different holding capacity.

10 Claims, 2 Drawing Sheets

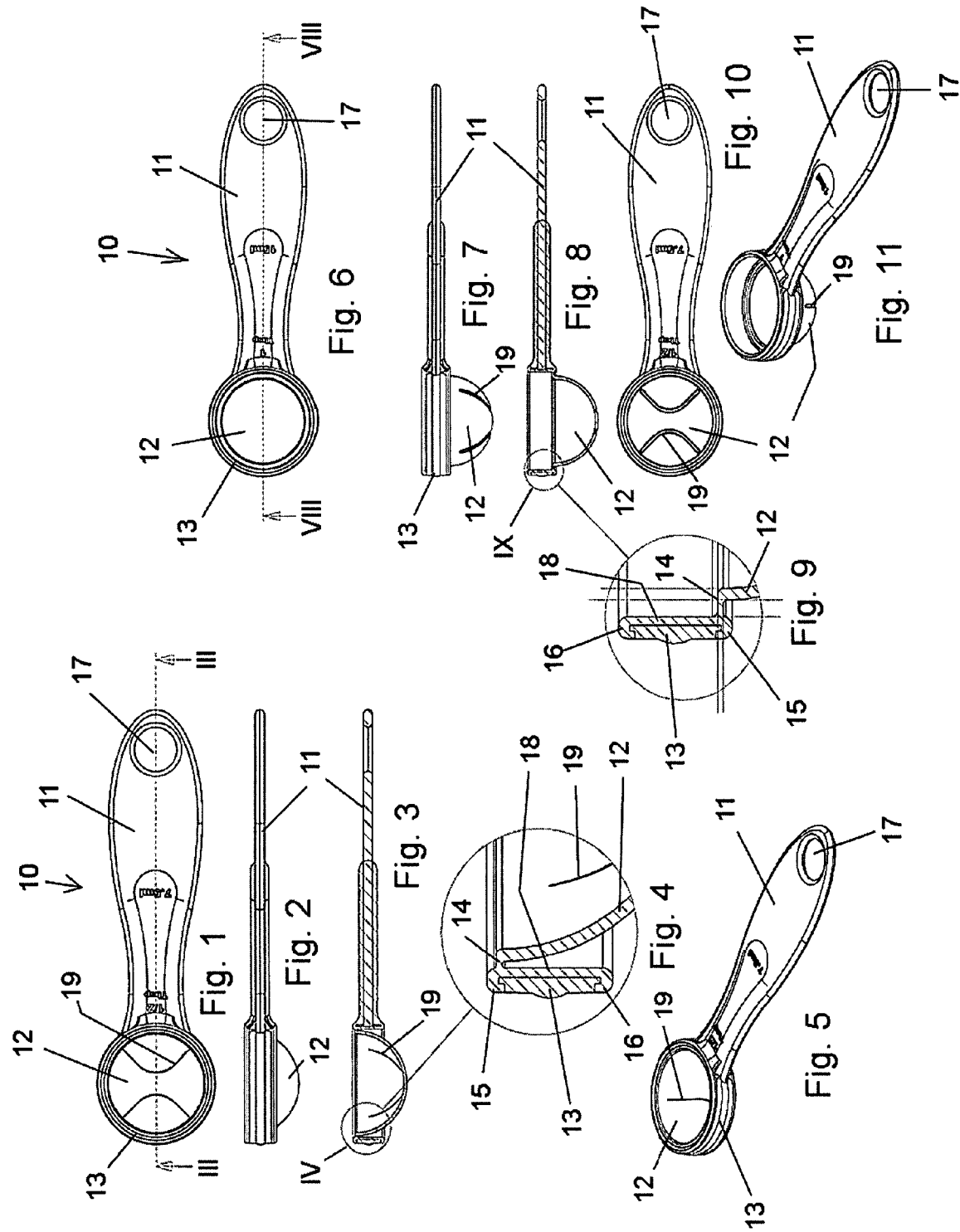

MEASURING DEVICE

BACKGROUND OF THE INVENTION

The present invention relates to a measuring device such as a spoon as might be used in the kitchen to measure ingredients for cooking and might equally be applicable to the oral administration of medicines. More particularly, although not exclusively, the invention relates to a measuring device having alternatively selectable capacities.

Known measuring spoons comprise a bowl or vessel having a handle extending therefrom. The vessel is of fixed capacity. Examples of kitchen spoon sizes are "teaspoon", "desert spoon" and "tablespoon". Each of these has a bowl or vessel with an internal volume that approximates a standard size. Similarly, spoons used for administering liquid oral medication have standard bowl volumes—usually quoted in cubic centimetres.

It is difficult with such known spoons to measure out or administer a volume that is somewhat less than that of the standard capacity. For example, "half a teaspoon" can only be roughly estimated.

OBJECTS OF THE INVENTION

It is an object of the present invention to overcome or substantially ameliorate at least one of the above disadvantages and/or more generally to provide an improved measuring device having one or more vessels of adjustable capacity.

DISCLOSURE OF THE INVENTION

There is disclosed herein a measuring device, comprising:
a handle made of substantially rigid material,
a vessel made of flexible material and having a peripheral hinge by which the vessel is supported by the handle, the peripheral hinge enabling the vessel to be reconfigured from a first configuration in which it has a first holding capacity, and a second configuration in which it has a second holding capacity that is different to the first holding capacity.

Preferably, the handle comprises a suspension frame to which the peripheral hinge is attached.

Preferably, the vessel comprises a suspension band attached to the suspension frame.

Preferably, the suspension band has top and bottom peripheries, and the peripheral hinge is situated closer to one of the peripheries than the other.

Preferably, the suspension band has a first peripheral retaining lip adjacent to the top periphery and a second peripheral retaining lip adjacent to the bottom periphery, each retaining lip extending about respective first and second edges of the suspension frame.

Preferably, the handle is made of plastics material.

Alternatively, the handle is made of metal.

Preferably, the vessel is made of rubber.

Alternatively, the vessel is made of resilient plastics material.

The measuring device might comprise a pair of said vessels—one at each respective end of the handle.

Preferably, each vessel is of mutually different size.

The invention will advantageously provide a single measuring device capable of being easily reconfigured to provide variable measuring capacities.

BRIEF DESCRIPTION OF THE DRAWINGS

Preferred forms of the present invention will now be described by way of example with reference to the accompanying drawings, wherein:

FIG. 1 is a schematic plan view of a measuring device with its vessel in a first configuration in which it's holding capacity is minimised, FIG. 2 is a schematic side elevation of the measuring device in the configuration shown in FIG. 1, FIG. 3 is a schematic cross-sectional elevation of the measuring device taken at III-III in FIG. 1, FIG. 4 is a schematic cross-sectional detailed partial elevation of that portion of the measuring device identified at IV in FIG. 3, FIG. 5 is a schematic perspective illustration of the measuring device in the configuration of FIGS. 1 to 4, FIG. 6 is a schematic plan view of the same measuring device with its vessel in a second configuration in which its holding capacity is maximised, FIG. 7 is a schematic side elevation of the measuring device in the configuration of FIG. 6, FIG. 8 is a schematic cross-sectional elevation of the measuring device taken at VIII-VIII in FIG. 6, FIG. 9 is a schematic cross-sectional detailed partial elevation of that portion of the measuring device identified at IX in FIG. 8, FIG. 10 is a schematic inverted plan view of the measuring device in the configuration depicted in FIG. 6, FIG. 11 is a schematic perspective illustration of the measuring device in the configuration of FIGS. 6 to 10.

DESCRIPTION OF THE PREFERRED EMBODIMENTS

Figure 12:
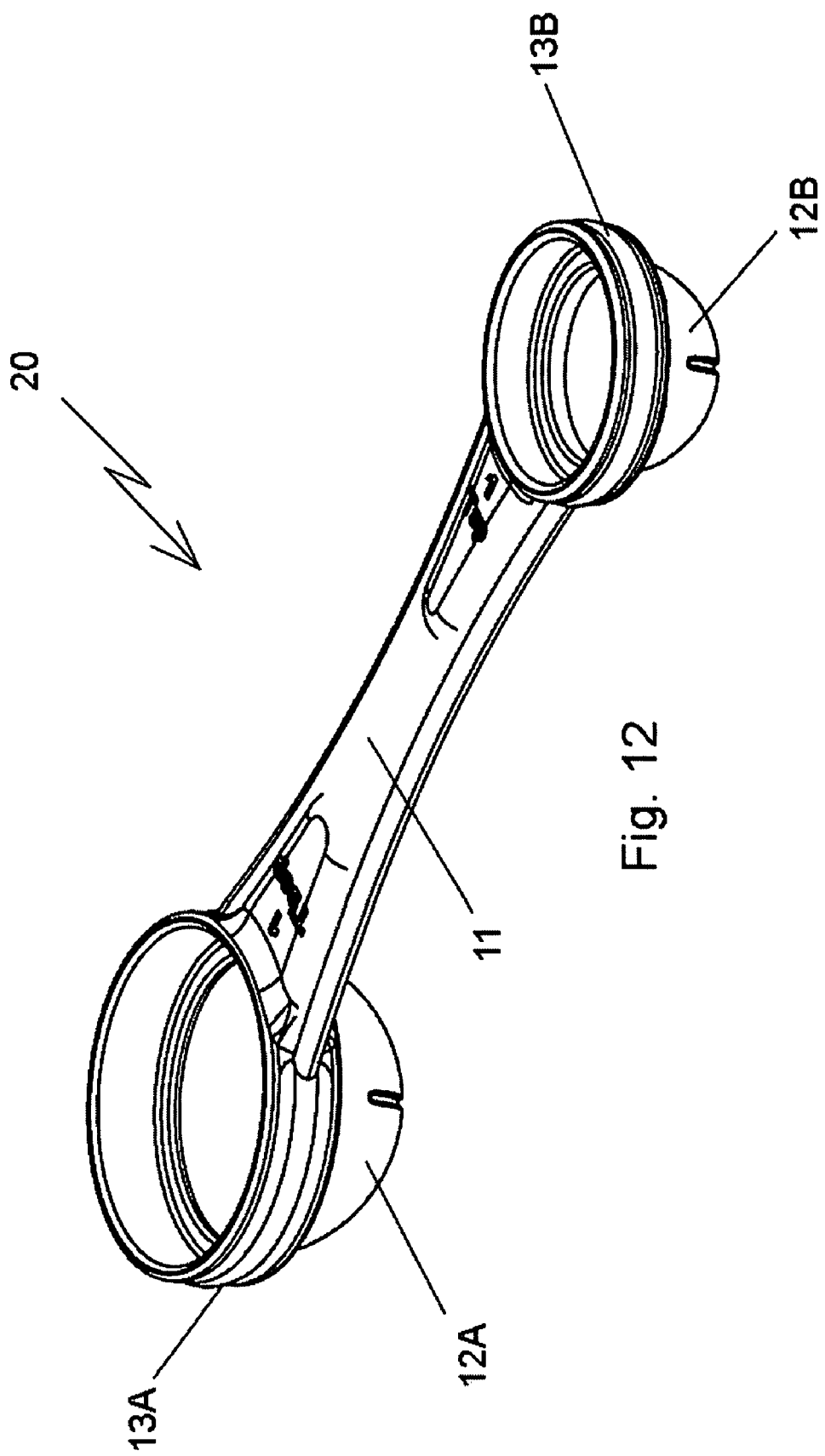
FIG. 12 is a schematic perspective illustration of an alternative measuring device having reconfigurable vessels at each end of its handle.

In FIGS. 1 to 11 of the accompanying drawings there is depicted schematically a measuring device or spoon 10. The spoon 10 comprises a handle 11 which might be made of metal or moulded plastics material for example. The exact material itself is not of critical importance, but it should be substantially rigid. The handle has an eyelet 17 by which the spoon could be suspended from a hook in a cupboard for example. At the opposite end of the handle 11, there is provided an integral suspension frame 13. The frame 13 supports a flexible vessel 12. The vessel 12 is made of flexible material such as rubber, or synthetic plastics material. The exact material itself is not of critical importance. Suffice to say that the material ought to be flexible and resilient. The vessel 12 includes a storage area or "vessel proper" of substantially hemispherical shape although this is not essential.

As Best shown in FIGS. 4 and 9, the suspension frame 13 is shaped somewhat like an egg frame and the vessel 12 comprises features at its periphery enabling it to be firmly attached to the suspension frame 13. Moreover, the vessel 12 has an integrally formed suspension band 18 which fits snugly inside the suspension frame 13 and comprising first and second continuous (circular) retaining lips 15 and 16 that fit tightly over the respective upper and lower extremities of the suspension frame 13. The vessel proper is hingedly contiguous with the suspension band 18 by means of a flexible peripheral hinge 14 which is typically slightly thinner than the vessel proper itself. The hinge 14 extends from an upper portion of the suspension band 18. In the configuration of the vessel proper as shown in FIGS. 1 to 5, the vessel proper takes on a minimised volume. However, the base of the vessel proper (the convex surface downwardly facing external surface of the vessel as shown in FIG. 2) can be pushed upwardly to "flip" or "inverted" the vessel into the inside-out configuration depicted in FIGS. 6 to 11. In the inside-out configuration of the measuring device as shown in these figures, the storage capacity of the vessel is maximised. This is brought about by the fact that the peripheral hinge 14 is positioned more closely to retaining lip 15 than retaining lip 16. The additional volume is provided by the height of the suspension band 18. In order to facilitate easy inversion of the vessel proper, it is provided with thinned or otherwise weakened lines 19 which reduce the inherent (albeit slight) rigidity of the vessel proper as brought about by its hemispherical shape.

In the configuration of FIGS. 1 to 5, the capacity of the vessel 12 might be that of a half teadevice, whereas in the configuration depicted in FIGS. 6 to 11, the capacity of the vessel 12 might be that of a full teadevice for example.

An alternative embodiment is shown in FIG. 12. In this embodiment, measuring device 20 has a vessel at each end. These would typically be a different size. For example, at one end of the handle 11, there is provided a large suspension frame 13A supporting a large invertible vessel 12A. At the opposite end of the handle 11, a smaller suspension frame 13B is provided which supports a smaller invertible vessel 12B.

It should be appreciated that modifications and alterations obvious to those skilled in the art are not to be considered as beyond the scope of the present invention. For example, whilst the depicted embodiment has a moulded plastics handle 11, the handled could be fabricated predominantly in metallic wire with a loop at one or both ends to form the suspension ring(s) 13. It should also be appreciated that the vessel can be released from the suspension frame 13 by peeling the retaining lips 15 and 16 away from the upper and lower edges of the retaining frame 13 for cleaning purposes or replacement for example. Furthermore, the vessel need not be substantially hemispherical in shape. It might for example be spherically oval in shape, cylindrical, or polygonal in horizontal cross section if desired.

The invention claimed is:

1. A measuring device, comprising:
   a handle made of substantially rigid material and having a suspension frame, and
   a vessel made of flexible material and having a peripheral hinge attached to the suspension frame by which the vessel is supported by the handle, the peripheral hinge enabling the vessel to be reconfigured from a first configuration in which it has a first holding capacity, and a second configuration in which it has a second holding capacity that is different to the first holding capacity, said vessel comprising a suspension band attached to the suspension frame, said suspension band having top and bottom peripheries and wherein the peripheral hinge is situated closer to one of the peripheries than the other.

2. The measuring device of claim 1, wherein the handle comprises a suspension frame to which the peripheral hinge is attached.

3. The measuring device of claim 2, wherein the vessel comprises a suspension band attached to the suspension frame.

4. The measuring device of claim 1, wherein the handle is made of plastics material.

5. The measuring device of claim 1, wherein the handle is made of metal.

6. The measuring device of claim 1, wherein the vessel is made of rubber.

7. The measuring device of claim 1, wherein the vessel is made of resilient plastics material.

8. The measuring device of claim 1, wherein the suspension band has a first peripheral retaining lip adjacent to the top periphery and a second peripheral retaining lip adjacent to the bottom periphery, each retaining lip extending about respective first and second edges of the suspension frame.

9. The measuring device of claim 1, comprising a pair of said vessels one at each respective end of the handle.

10. The measuring device of claim 9, wherein each vessel is of mutually different size.

* * * * *